(12) United States Patent
Lin et al.

(10) Patent No.: US 11,873,241 B2
(45) Date of Patent: Jan. 16, 2024

(54) SUSPENDED BED ELECTRO-MEMBRANE BIOREACTOR SYSTEM

(71) Applicant: Yantai University, Yantai (CN)

(72) Inventors: Shaoying Lin, Yantai (CN); Changfei Gao, Yantai (CN); Jianhua Wang, Yantai (CN)

(73) Assignee: YANTAI UNIVERSITY, Yantai (CN)

( * ) Notice: Subject to any disclaimer, the term of this patent is extended or adjusted under 35 U.S.C. 154(b) by 0 days.

(21) Appl. No.: 18/329,628

(22) Filed: Jun. 6, 2023

(65) Prior Publication Data

US 2023/0406747 A1    Dec. 21, 2023

(30) Foreign Application Priority Data

Jun. 14, 2022   (CN) .......................... 202210665810.3

(51) Int. Cl.
*C02F 11/15* (2019.01)
*C02F 3/28* (2023.01)
*C02F 3/30* (2023.01)

(52) U.S. Cl.
CPC ............ *C02F 11/15* (2019.01); *C02F 3/2853* (2013.01); *C02F 3/30* (2013.01); *C02F 2201/003* (2013.01); *C02F 2201/46115* (2013.01); *C02F 2203/006* (2013.01)

(58) Field of Classification Search
CPC .......... C02F 11/15; C02F 3/2853; C02F 3/30; C02F 2201/003; C02F 2201/46115; C02F 2203/006

USPC ................. 210/617, 605, 630, 620
See application file for complete search history.

(56) References Cited

FOREIGN PATENT DOCUMENTS

| CN | 102381753 A | 3/2012 |
|----|-------------|--------|
| CN | 103496789 A | 1/2014 |
| CN | 110228845 A | 9/2019 |
| CN | 111584913 A | 8/2020 |
| WO | WO 2015/103590 A1 * | 7/2015 |

* cited by examiner

*Primary Examiner* — Fred Prince
(74) *Attorney, Agent, or Firm* — Rachel Pilloff; Sean Passino; Martin Cosenza

(57) ABSTRACT

A suspended bed electro-membrane bioreactor system is provided, including a cathode chamber with a tubular structure with a sealed bottom; an anode chamber with a tubular structure located in the cathode chamber, where there is a gap between an outer wall of the anode chamber and an inner wall of the cathode chamber, and the anode chamber is provided with a proton channel region in a middle, is fixedly connected with an anode cover plate in a top and is filled with an anode assembly; a stainless steel membrane module located in the gap and electrically connected with the anode assembly; a polymethyl methacrylate partition plate located in the gap, forming a closed cylindrical space with the stainless steel membrane module and communicating the cathode chamber and the anode chamber; and a suspended bed filled between the closed cylindrical space and the anode chamber.

6 Claims, 5 Drawing Sheets

SUSPENDED BED ELECTRO-MEMBRANE BIOREACTOR SYSTEM

CROSS-REFERENCE TO RELATED APPLICATIONS

This application claims priority of Chinese Patent Application No. 202210665810.3, filed on Jun. 14, 2022, the entire contents of which are incorporated herein by reference.

TECHNICAL FIELD

The application relates to the technical field of wastewater purification and wastewater resource utilization, and in particular to a suspended bed electro-membrane bioreactor system.

BACKGROUND

In recent years, energy problems and environmental problems have become increasingly prominent. Microbial fuel cell (MFC), as a new technology combining wastewater treatment and bioelectricity production, has been widely concerned at home and abroad. At present, the effluent quality of microbial fuel cell wastewater treatment process is generally poor, and it is urgent to improve the effluent quality by coupling with other processes. Membrane bioreactor (MBR) is a new and efficient wastewater treatment technology integrating wastewater biological treatment technology and membrane separation technology. However, membrane fouling has always prevented MBR from being widely used. At present, the most conventional method to improve the anti-fouling performance of the MBR is to increase the aeration rate and to slow down the deposition of biomass on the membrane surface by increasing vibration and longitudinal shear force on the membrane surface, but the actual effect is limited. In the process of operation, only by constantly cleaning the membrane by operators may the membrane flux be effectively recovered, but the process is very inconvenient.

Therefore, it is urgent to develop a suspended bed electro-membrane bioreactor system to solve the above problems.

SUMMARY

An objective of the present application is to provide a suspended bed electro-membrane bioreactor system, including:
a cathode chamber, where the cathode chamber is a tubular structure with a sealed bottom;
an anode chamber, where the anode chamber is a tubular structure, the anode chamber is located in the cathode chamber, there is a gap between an outer wall of the anode chamber and an inner wall of the cathode chamber, a middle of the anode chamber is provided with a proton channel region, a top of the anode chamber is fixedly connected with an anode cover plate, and the anode chamber is filled with an anode assembly;
a stainless steel membrane module, where the stainless steel membrane module is located in the gap, and the anode assembly is electrically connected with the stainless steel membrane module;
a polymethyl methacrylate partition plate, where the polymethyl methacrylate partition plate is located in the gap, the polymethyl methacrylate partition plate and the stainless steel membrane module enclose a closed cylindrical space, and the cathode chamber and the anode chamber are communicated through the polymethyl methacrylate partition plate; and
a suspended bed, where the suspended bed is filled between the closed cylindrical space and the anode chamber.

In an embodiment, the anode assembly includes a carbon felt, a carbon rod and biological conductive particles, the carbon felt wraps the biological conductive particles, the carbon felt wrapped with the biological conductive particles is filled in the anode chamber, the carbon rod penetrates through the anode cover plate, a bottom end of the carbon rod is inserted into the carbon felt wrapped with the biological conductive particles, the carbon rod is in close contact with the carbon felt and the biological conductive particles, a top end of the carbon rod extends out of the anode chamber, and the carbon rod is electrically connected with the stainless steel membrane module;

In an embodiment, the biological conductive particles are graphite particles and activated carbon particles, and a volume ratio of the graphite particles to the activated carbon particles is 1:1.

In an embodiment, the stainless steel membrane module includes a stainless steel plate A, a stainless steel plate B and a carbon fiber-based conductive film, where a thickness of the stainless steel plate A is smaller than a thickness of the stainless steel plate B; the stainless steel plate B is fixedly connected to a side of the stainless steel plate A away from the anode chamber; the carbon fiber-based conductive film is fixedly embedded in the stainless steel plate B; and the stainless steel plate A, the stainless steel plate B and the carbon fiber-based conductive film are all electrically connected with the carbon rod.

In an embodiment, the carbon fiber-based conductive film includes a PVDF film, and the PVDF film is coated with a carbon fiber cloth.

In an embodiment, the proton channel region includes a plurality of channel assemblies, the plurality of channel assemblies are equidistantly arranged in a circumferential direction, each of the channel assemblies includes a plurality of pore channels (4) arranged equidistantly in a vertical direction, and the pore channels (4) penetrate through on the outer wall of the anode chamber.

In an embodiment, the suspended bed electro-membrane bioreactor system further includes a saturated calomel reference electrode, a top of the anode cover plate is penetrated with a reference electrode port, the saturated calomel reference electrode is inserted into the anode chamber through the reference electrode port, and the saturated calomel reference electrode is electrically connected with the external data collection system.

In an embodiment, the suspended bed electro-membrane bioreactor system further includes aeration devices, a plurality of the aeration devices are arranged, all of the aeration devices are fixedly connected to an inner wall of a bottom of the cathode chamber, and all of the aeration devices are communicated with an external aeration pump.

In an embodiment, the suspended bed is a filler inoculated with aerobic sludge.

In an embodiment, a bottom of the cathode chamber is communicated with a water inlet valve, a water outlet end of the water inlet valve is communicated with a water inlet pipe B, a bottom of the anode chamber is communicated with a water inlet pipe A, and water inlet pipe A is communicated with the water inlet pipe B.

The embodiments have the following beneficial effects.

In the application, MFC and MBR are technically coupled, and electrostatic repulsion formed by micro-electric field not only pushes organic pollutants away from the membrane surface, but also strengthens the reverse diffusion of the pollutants from the stainless steel membrane module to liquid phase. Therefore, the deposition of the pollutants on the membrane surface is reduced, membrane fouling is alleviated, and wastewater is treated economically and efficiently.

In the application, the suspended bed is filled between the closed cylindrical space surrounded by the polymethyl methacrylate partition plate and the stainless steel membrane module and the anode chamber, and the surface of the stainless steel membrane module is frequently washed under the action of aeration, so as to alleviate the deposition of biomass on the membrane surface and further to alleviate the membrane fouling.

The application obviously increases the contact interface between the wastewater and microorganisms, and continuously carry out anaerobic biological treatment and aerobic biological treatment on the wastewater, with strong load impact resistance, so the wastewater is treated economically and efficiently.

In the application, the stainless steel membrane module is both a cathode and an electro-membrane bioreactor, and also is used as a filtration membrane, so the effluent quality is effectively guaranteed.

The application is a double-chamber structure, the anode chamber and the cathode chamber are both cylindrical structures, the stainless steel membrane module and the polymethyl methacrylate partition plate form an embracing structure between the anode chamber and the cathode chamber, and the top of the anode chamber is sealed by the carbon felt, which provides an anaerobic environment on the one hand and a biofilm formation medium for anaerobic microorganisms on the other hand; moreover, a hydraulic retention time is effectively increased when the water flows through the carbon felt, and further a biological treatment effect of pollutants is improved.

In the application, proton transfer is carried out between the anode chamber and the cathode chamber through the proton channel region; moreover, through the carbon felt, oxygen is naturally blended through vertical trickle filtration, which effectively reduces the aeration power at the bottom of the cathode chamber, effectively improves the dissolved oxygen level in the cathode chamber and obviously promotes the power generation capacity of the system.

BRIEF DESCRIPTION OF THE DRAWINGS

In order to more clearly explain the embodiments of the present application or the technical solutions in the prior art, the following will briefly introduce the drawings to be used in the embodiments. Obviously, the drawings in the following description are only some embodiments of the present application. For those of ordinary skill in the art, other drawings may be obtained according to these drawings without any creative effort.

DETAILED DESCRIPTION

The technical schemes of the present application are clearly and completely described below with reference to the drawings, and it is clear that the described embodiments are a part of the embodiments of the present application, and not all of them. Based on the embodiments in the present application, all other embodiments obtained by a person of ordinary skill in the art without making creative labor fall within the scope of protection of the present application.

In order to make the above objective, features and advantages of the application obvious and understandable, the application is further explained in detail below with reference to the drawings and detailed description.

Figure 1:
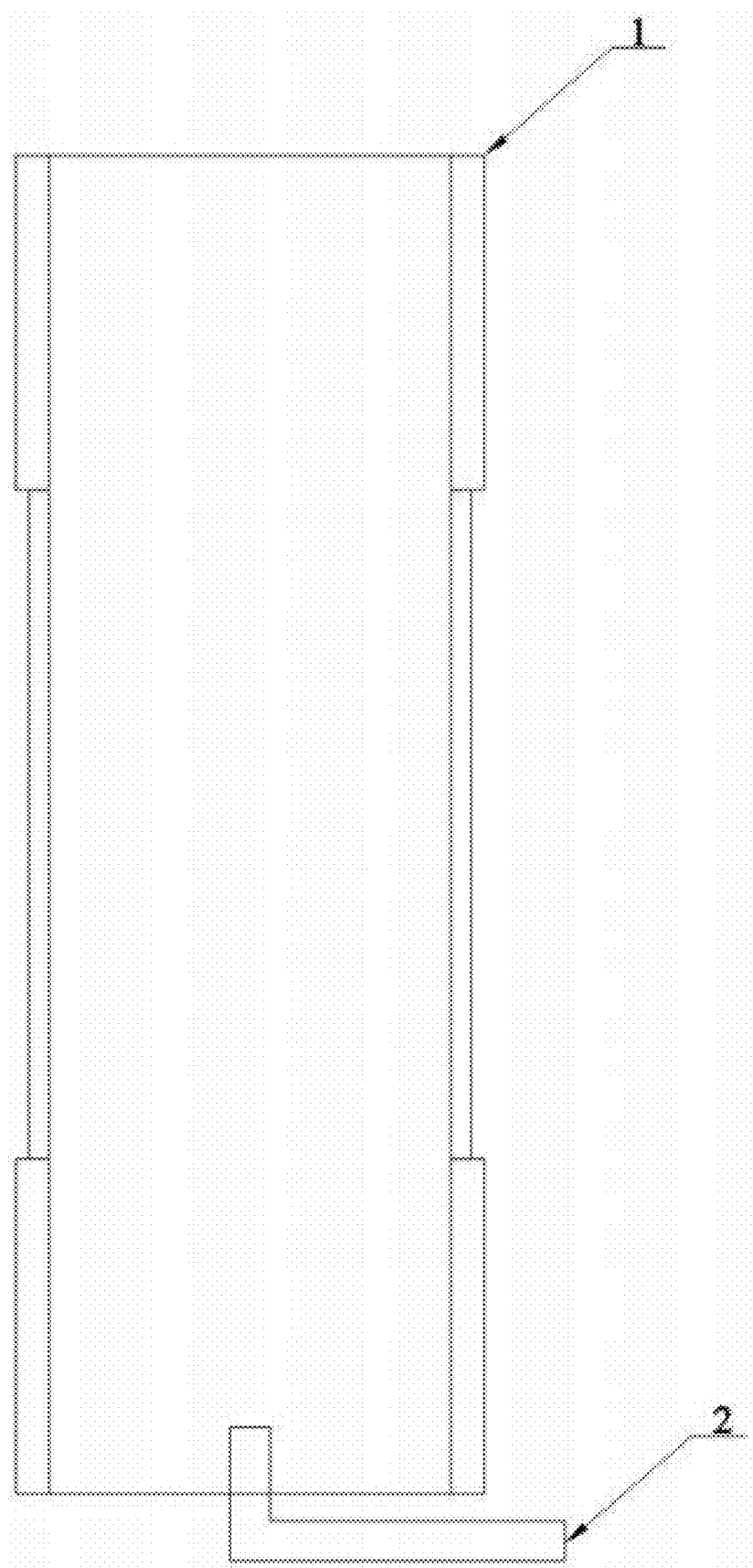
FIG. 1 is a front view of an anode chamber of the present application.
Figure 2:
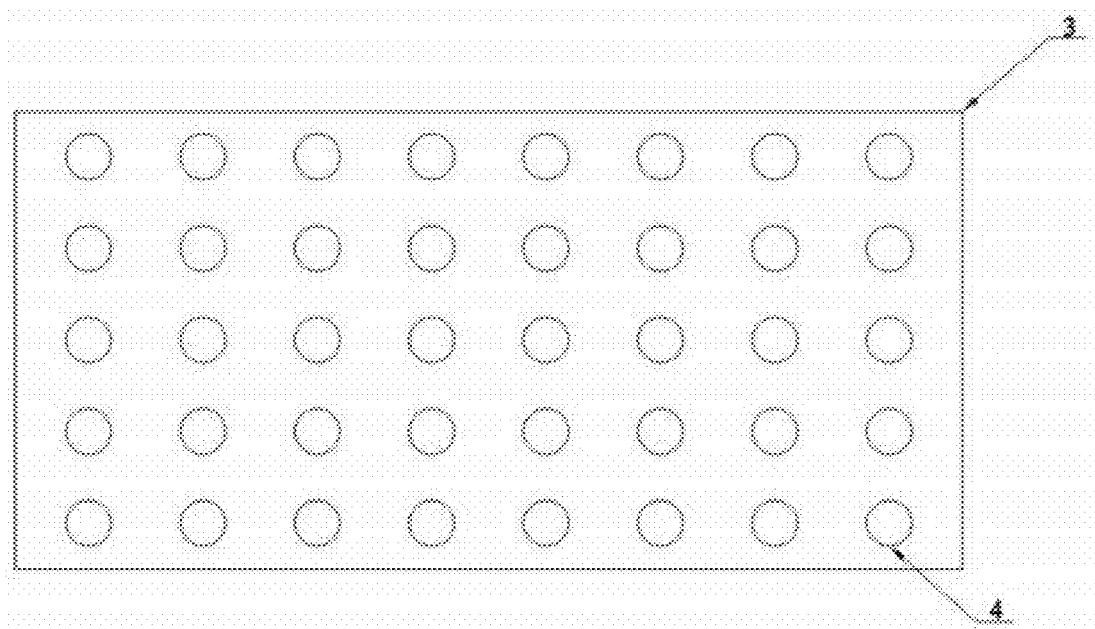
FIG. 2 is a schematic diagram of a proton channel region of the present application.
Figure 3:
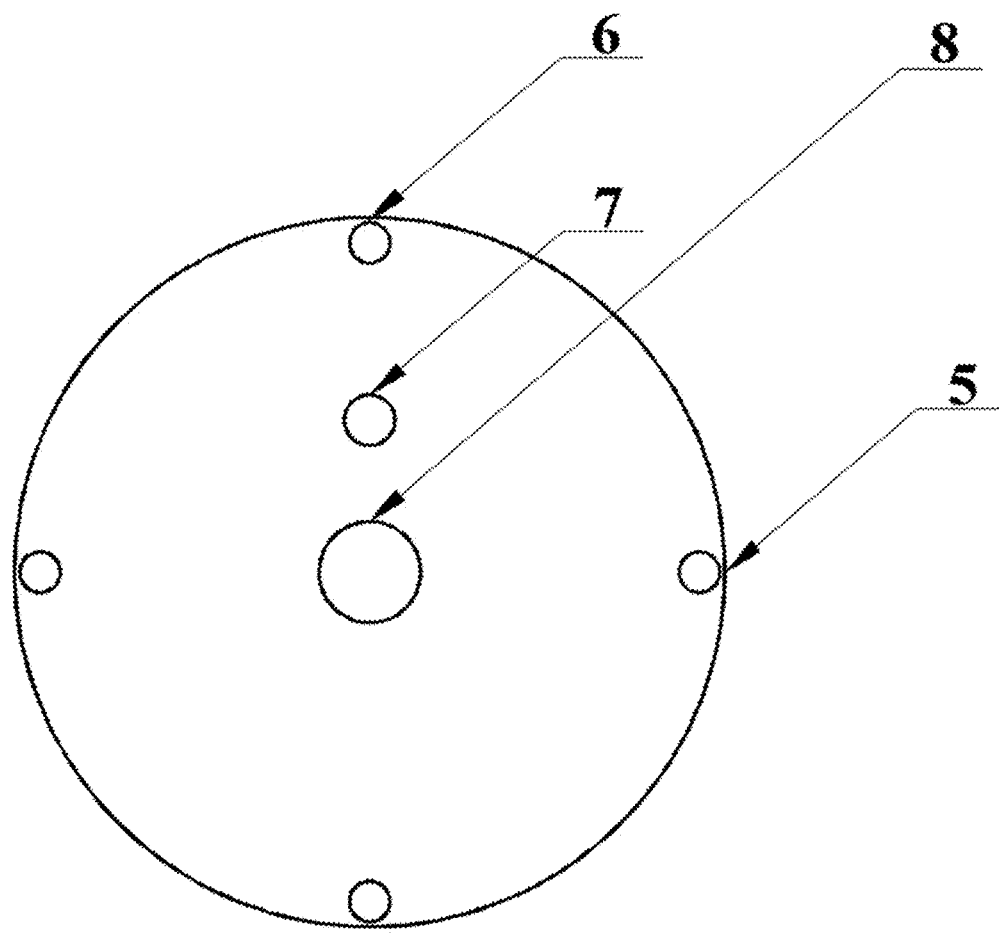
FIG. 3 is a top view of an anode chamber of the present application.
Figure 4:
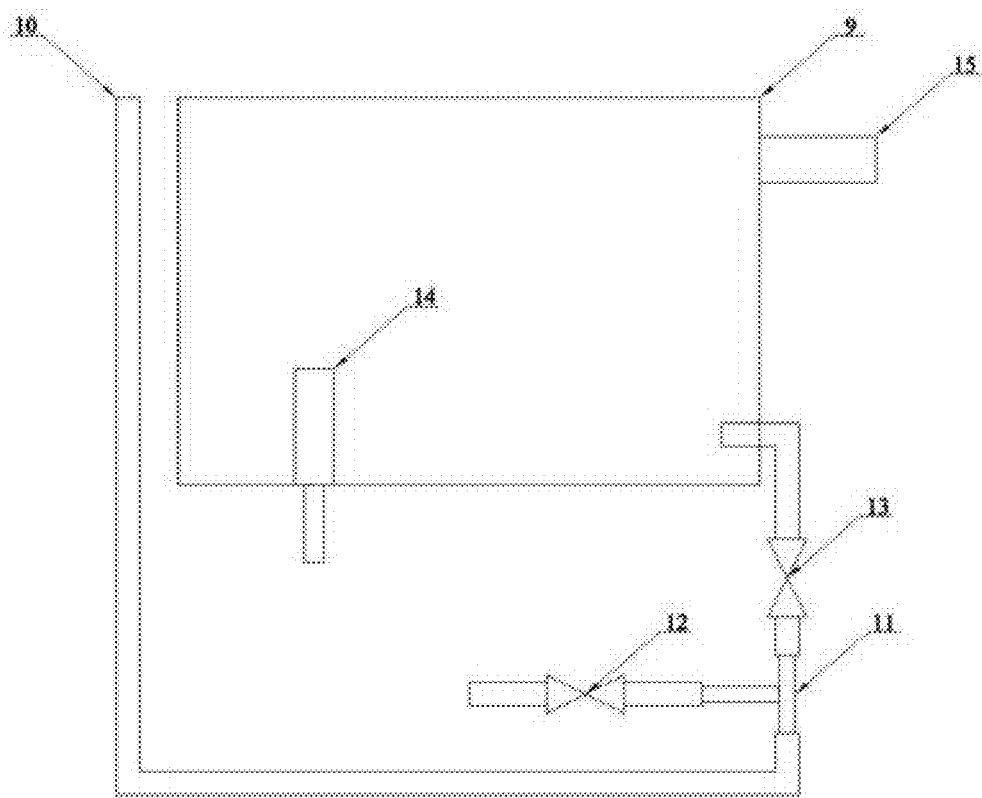
FIG. 4 is a front view of a cathode chamber of the present application.
Figure 5:
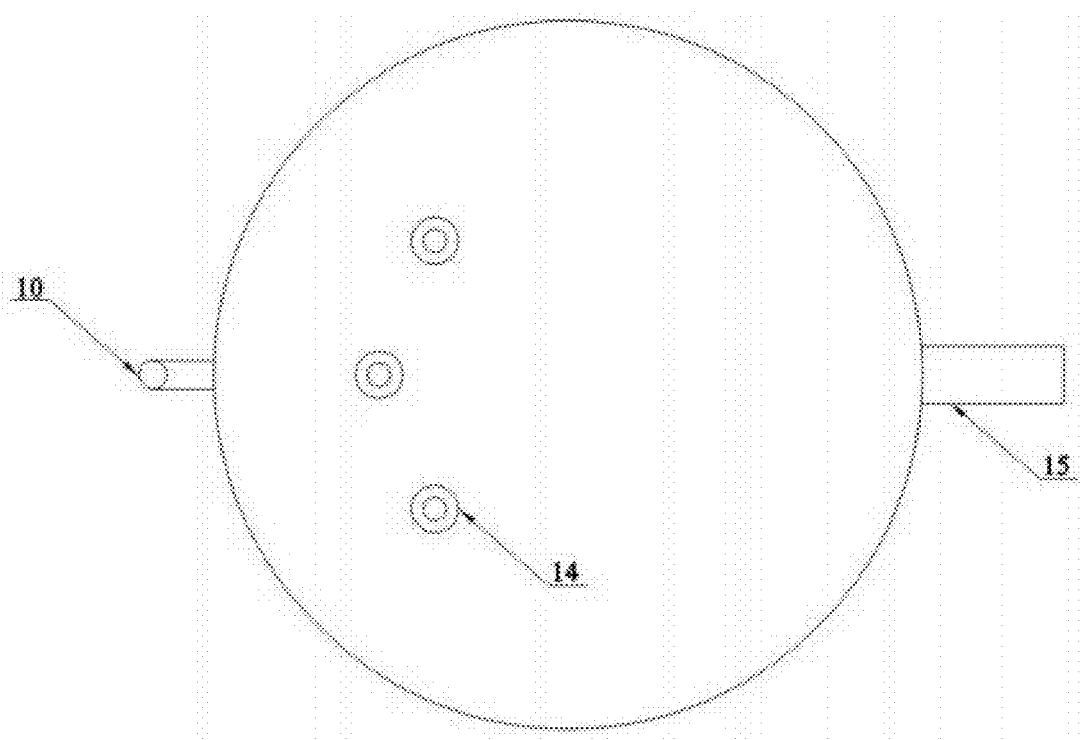
FIG. 5 is a top view of a cathode chamber of the present application.
Figure 6:
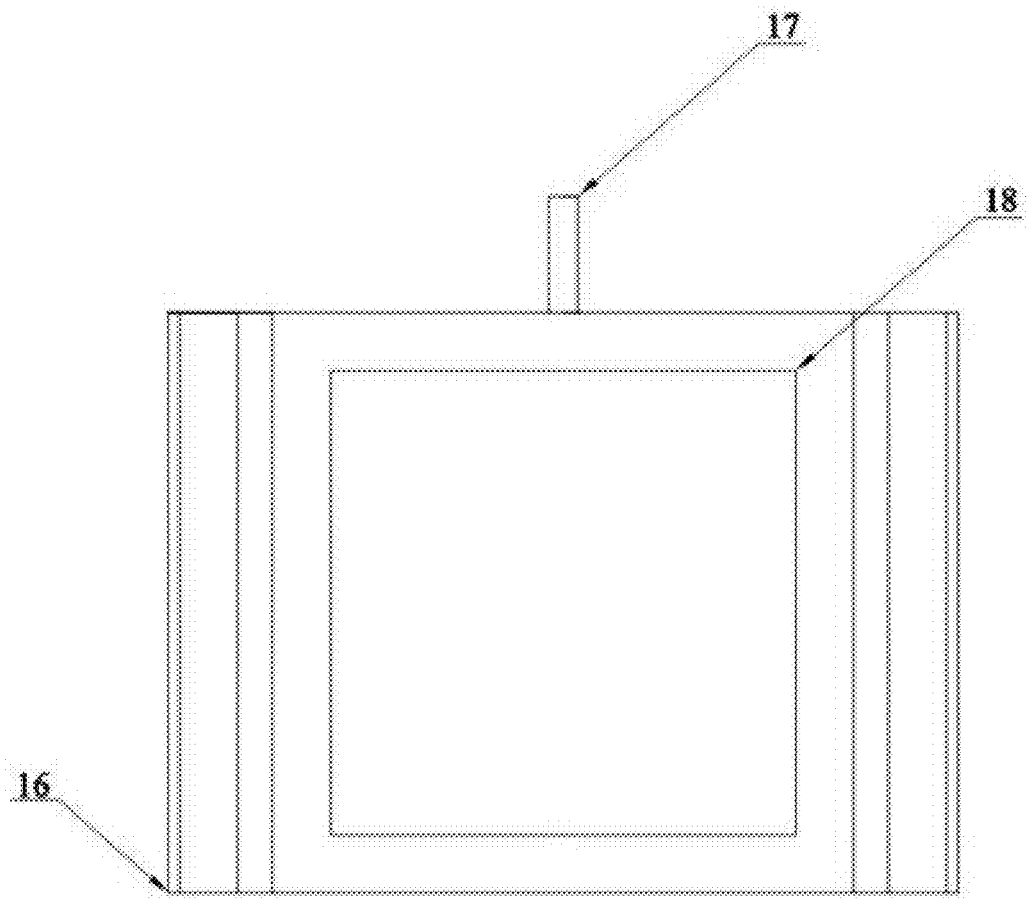
FIG. 6 is a front view of a stainless steel membrane module of the present application.
Figure 7:
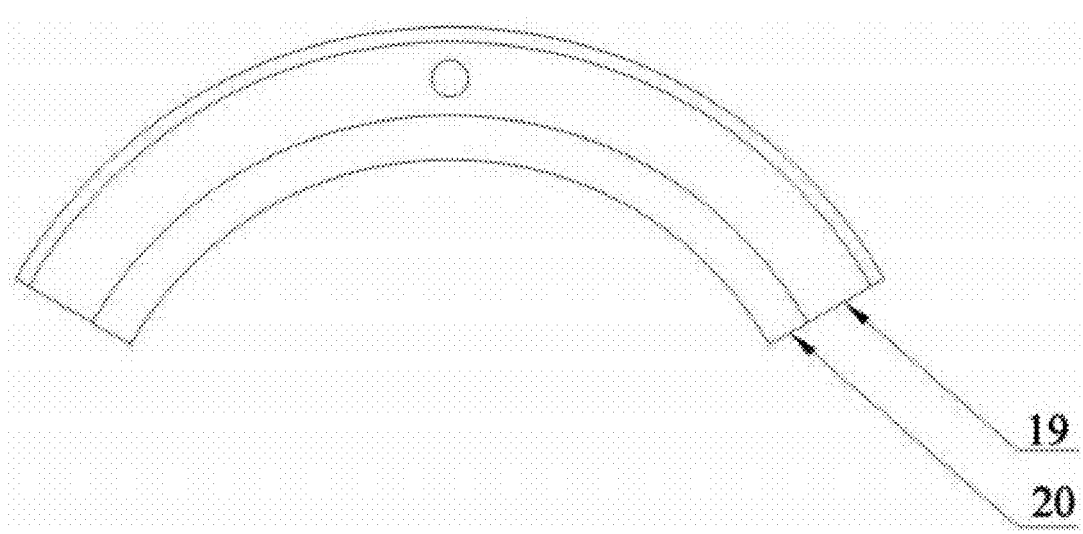
FIG. 7 is a top view of a stainless steel membrane module of the present application.
Figure 8:
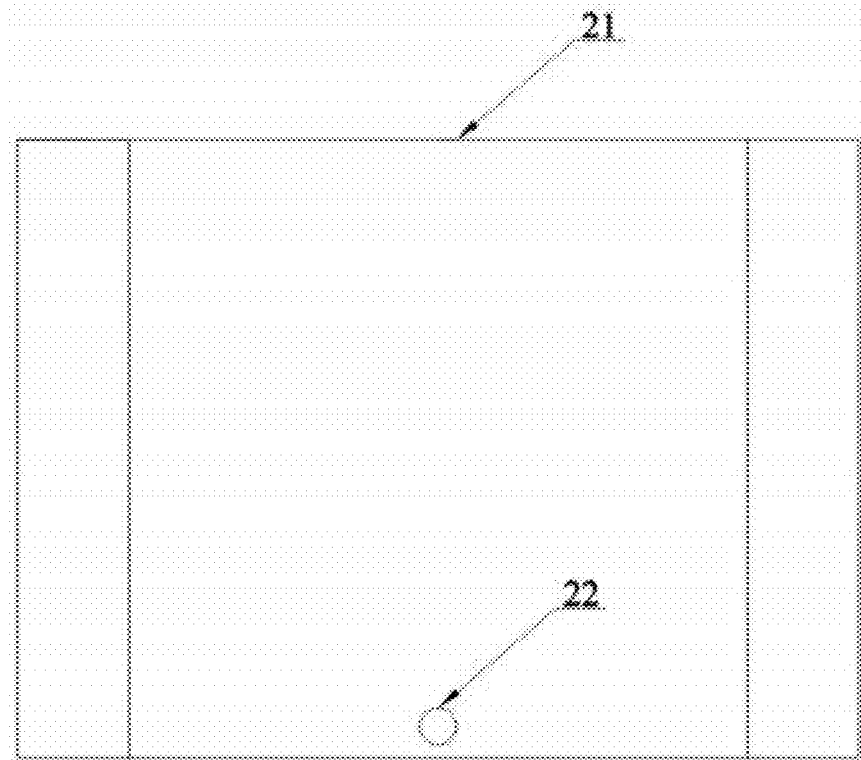
FIG. 8 is a front view of a polymethyl methacrylate partition plate of the present application.
Figure 9:
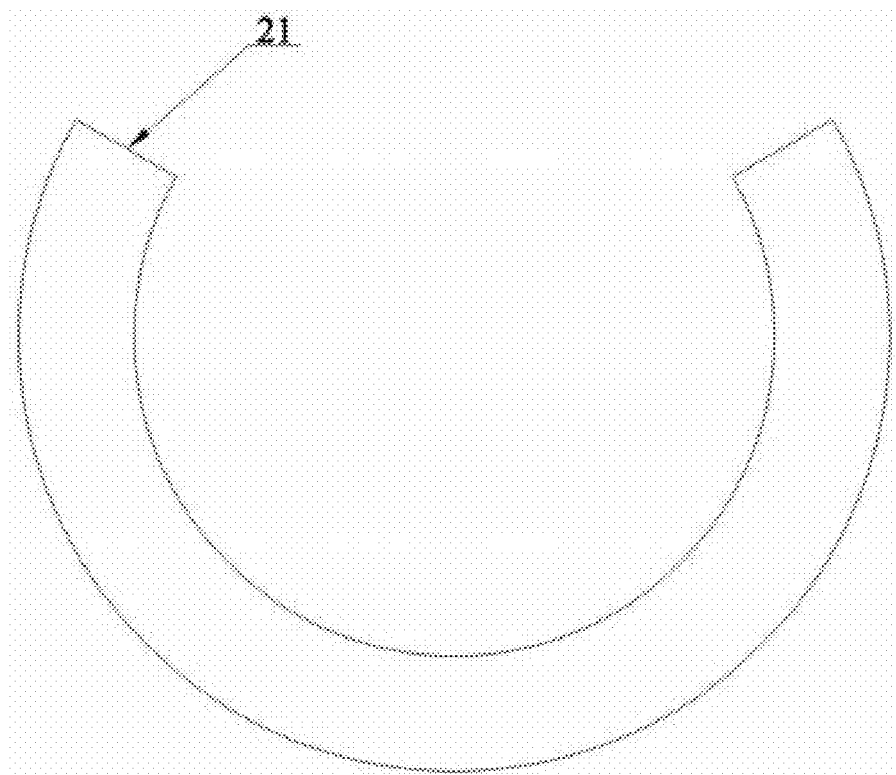
FIG. 9 is a top view of a polymethyl methacrylate partition plate of the present application.

Referring to FIG. 1-FIG. 9, the application provides a suspended bed electro-membrane bioreactor system, including:

a cathode chamber 9, where the cathode chamber 9 is a tubular structure with a sealed bottom;

an anode chamber 1, where the anode chamber 1 is a tubular structure, is located in the cathode chamber 9, is provided with a proton channel region 3 in a middle, is fixedly connected with an anode cover plate 5 at a top, and is filled with an anode assembly, where there is a gap between an outer wall of the anode chamber 1 and an inner wall of the cathode chamber 9;

proton transfer is carried out between the anode chamber 1 and the cathode chamber 9 through the proton channel region 3; moreover, through the carbon felt, oxygen is naturally blended through vertical trickle filtration, which effectively reduces a aeration power at the bottom of the cathode chamber 9, effectively improves a dissolved oxygen level in the cathode chamber 9 and obviously promotes the power generation capacity of the system.

a stainless steel membrane module 16, where the stainless steel membrane module 16 is located in the gap and is electrically connected with the anode assembly;

a polymethyl methacrylate partition plate 21, where the polymethyl methacrylate partition plate 21 is located in the gap as well as forms a closed cylindrical space with the stainless steel membrane module 16, and the cathode chamber 9 and the anode chamber 1 are communicated through the polymethyl methacrylate partition plate 21; and a suspended bed, where the suspended bed is filled between the closed cylindrical space and the anode chamber 1.

In an embodiment, the cathode chamber 9 is a cylindrical tubular structure with the sealed bottom, and the anode chamber 1 has a cylindrical tubular structure.

In an embodiment, a side wall at a top of the cathode chamber 9 is fixedly connected with an overflow pipe 15, and the overflow pipe 15 is communicated with the cathode chamber 9.

In an embodiment, the top of the anode chamber 1 is sealed by a carbon felt, and the carbon felt spreads downwards around, and jacking wastewater from the top of the anode chamber 1 overflows into the cathode chamber 9 through the carbon felt. The carbon felt at the top of the anode chamber 1 has functions of diversion and biofilm formation. The carbon felt seals the top of the anode chamber 1 and is folded down into the cathode chamber 9. The jacking wastewater from the anode chamber 1 overflows through the carbon felt at the top of the anode chamber 1 and enters the cathode chamber 9. The cathode chamber 9 forms an aerobic biofilm formation environment due to natural ventilation with air outside the chamber. The wastewater to be treated continuously passes through the anode chamber 1 for anaerobic treatment and the cathode chamber 9 for aerobic biological treatment.

The application adopts a double-chamber structure, the anode chamber 1 and the cathode chamber 9 both are cylindrical structures, the stainless steel membrane module and the polymethyl methacrylate partition plate 21 form an embracing structure between the anode chamber 1 and the cathode chamber 9, and the top of the anode chamber 1 is tightly sealed by the carbon felt, which provides an anaerobic environment on the one hand and a biofilm formation medium for anaerobic microorganisms on the other hand; moreover, a hydraulic retention time is effectively increased when the water flows through the carbon felt, and further a biological treatment effect of pollutants is improved.

In an embodiment, an anode cover plate 5 is perforated and provided with a plurality of screw holes 6, and screws pass through the screw holes 6 and are screwed with the anode chamber 1 to fix the anode cover plate 5 at the top of the anode chamber 1.

In an embodiment, the anode assembly includes the carbon felt, a carbon rod and biological conductive particles, the carbon felt wraps the biological conductive particles, the biological conductive particles provide film-forming attachment points for electricigens, the carbon felt is used as a biofilm formation medium for the microorganisms and a conductive medium, and the carbon felt wrapped with the biological conductive particles is filled in the anode chamber 1. The carbon rod penetrates through the anode cover plate 5, a bottom end of the carbon rod is inserted into the carbon felt wrapped with the biological conductive particles, the carbon rod is in close contact with the carbon felt and the biological conductive particles, a top end of the carbon rod extends out of the anode chamber 1, and the carbon rod is electrically connected with the stainless steel membrane module 16.

In an embodiment, a top of the anode cover plate 5 is provided with an anode port 7, and the carbon rod penetrates through the anode cover plate 5 through the anode port 7.

In an embodiment, the carbon rod is electrically connected with an external data collection system.

In an embodiment, the carbon rod is externally connected with a resistor, where the carbon rod, the resistor and the stainless steel membrane module 16 form a closed loop.

In an embodiment, a filling rate of the biological conductive particles is 75 percent (%)-90%.

In an embodiment, the biological conductive particles include graphite particles and activated carbon particles, where a volume ratio of the graphite particles to the activated carbon particles is 1:1.

In an embodiment, the stainless steel membrane module 16 includes a stainless steel plate A 20, a stainless steel plate B 19 and a carbon fiber-based conductive film, where a thickness of the stainless steel plate A 20 is smaller than a thickness of the stainless steel plate B 19; the stainless steel plate B 19 is fixedly connected to a side of the stainless steel plate A 20 away from the anode chamber 1; the carbon fiber-based conductive film is fixedly embedded in the stainless steel plate B 19; and the stainless steel plate A 20, the stainless steel plate B 19 and the carbon fiber-based conductive film are all electrically connected with the carbon rod.

The cathode chamber 9 is an electro-membrane bioreactor, and the carbon fiber-based conductive film is used as a membrane filtration component for filtering pollutants and also used as a conductive cathode of an MFC for providing active sites for redox reactions.

In an embodiment, a middle of the stainless steel plate B 19 is provided with a cavity 18, the carbon fiber-based conductive film is fixedly connected in the cavity 18, a top of the stainless steel plate B 19 is fixedly connected with a water outlet pipe 17, the water outlet pipe 17 is communicated with the cavity 18, and the water outlet pipe 17 is communicated with a peristaltic pump through a hose to discharge water under a negative pressure.

In an embodiment, a height of the stainless steel plate A 20, a height of the stainless steel plate B 19 and a height of the polymethyl methacrylate partition plate 21 are all equal to a height of the cathode chamber 9.

In an embodiment, a thickness of the polymethyl methacrylate partition plate 21 is a sum of a thicknesses of the stainless steel plate A 20 and a thicknesses of the stainless steel plate B 19; the polymethyl methacrylate partition plate 21, the stainless steel plate A 20 and the stainless steel plate B 19 all have arc structures; and the polymethyl methacrylate partition plate 21 and the stainless steel membrane module 16 enclose a closed cylindrical structure.

In an embodiment, the carbon fiber-based conductive film includes a PVDF film, and the PVDF film is coated with a carbon fiber cloth.

In an embodiment, the proton channel region 3 includes a plurality of channel assemblies, the channel assemblies are equidistantly arranged in a circumferential direction, each of the channel assemblies includes a plurality of pore channels 4 arranged equidistantly in a vertical direction, and the pore channels 4 penetrate through the outer wall of the anode chamber 1.

In an embodiment, the suspended bed electro-membrane bioreactor system also includes a saturated calomel reference electrode, the top of the anode cover plate 5 is penetrated with a reference electrode port 8, the saturated calomel reference electrode is inserted into the anode chamber 1 through the reference electrode port 8, and the saturated calomel reference electrode is electrically connected with the external data collection system.

In an embodiment, the suspended bed electro-membrane bioreactor system also includes a plurality of aeration devices 14, the aeration devices 14 are used for supplementing dissolved oxygen, and all of the aeration devices 14 are fixedly connected to an inner wall of a bottom of the cathode chamber 9 as well as are communicated with an external aeration pump.

In an embodiment, the aeration devices 14 are aeration bars or aeration stones.

In an embodiment, the suspended bed is a filler inoculated with aerobic sludge and carries out efficient aerobic biological treatment. At a same time, under an action of aeration, the filler washes a surface of the stainless steel membrane module 16 and thereby alleviates fouling of the stainless steel membrane module 16.

In an embodiment, the bottom of the cathode chamber 9 is communicated with a water inlet valve 13, a water outlet end of the water inlet valve 13 is communicated with a water inlet pipe B 10, a bottom of the anode chamber 1 is communicated with a water inlet pipe A 2, and the water inlet pipe A 2 is communicated with the water inlet pipe B 10.

In an embodiment, the cathode chamber 9 is also provided with an exhaust valve 12 and a tee-junction 11, and the exhaust valve 12, the water inlet pipe B 10 and the water inlet valve 13 are all communicated with the tee-junction 11.

When water enters, the exhaust valve 12 is opened and the water inlet valve 13 is closed, and the air in the water inlet pipe A 2 is exhausted through the water inlet pipe B 10 and the tee-junction 11. After the air is exhausted, the exhaust valve 12 is closed and the water inlet valve 13 is opened, and the water enters the anode chamber 1 through the water inlet pipe A 2 and the water inlet pipe B 10.

In an embodiment, a bottom of the polymethyl methacrylate partition plate 21 is provided with a hose channel 22, the water inlet pipe A 2 is communicated with a hose, and a tail end of the hose is communicated with the water inlet pipe B 10 through the hose channel 22.

In an embodiment, an internal dimension of the anode chamber 1 is $\Phi 6$ centimeter (cm)$\times$H20 cm, a volume of the anode chamber 1 is 0.57 Liter (L), and a wall thickness of the anode chamber 1 is 5 millimeter (mm);

a size of the proton channel region 3 is $\Phi 6.6$ cm$\times$H10 cm, a wall thickness of the proton channel region 3 is 3 mm, the proton channel region is provided with 40 holes, and a diameter of each of the pore channels 4 is 1 cm;

a thickness of the carbon felt is 8 mm, a diameter of the carbon rod is 4 mm, and a particle size of the biological conductive particles is 3 mm;

the anode cover plate 5 is provided with four the screw holes 6 with a diameter of 4 mm;

an internal dimension of the cathode chamber 9 is $\Phi 15$ cm$\times$H10 cm, and a volume of the cathode chamber 9 is 1.77 L;

an outer dimension of the stainless steel membrane module 16 is $\Phi 13.6$ cm$\times$H10 cm, an angle of the stainless steel membrane module 16 is 120°, a thickness of the stainless steel plate A 20 is 6 mm, a thickness of the stainless steel plate B 19 is 12 mm, a dimension of the cavity 18 is $\Phi 13.6$ cm$\times$H8 cm, an angle of the cavity 18 is 90°, and a thickness of the cavity 18 is 6 mm.

an outer dimension of the polymethyl methacrylate partition plate 21 is $\Phi 13.6$ cm$\times$H10 cm, a thickness of the polymethyl methacrylate partition plate 21 is 18 mm, an angle of the polymethyl methacrylate partition plate 21 is 240°, and an inner diameter of the hose channel 22 is $\Phi 6$ mm;

a distance between axis centers of the aeration devices 14 and an axis center of the cathode chamber 9 is 4 mm, and an included angle between two adjacent aeration devices 14 is 45°;

where H is the height and $\Phi$ is the diameter.

An operation principle of the application is as follows.

The application is a double-chamber embracing structure, water enters the anode chamber 1 from the bottom of the anode chamber in a reverse flow mode, is discharged through the top of the anode chamber and is replenished with oxygen, so that a dissolved oxygen level in the treated water is changed and an appropriate microbial structure is adjusted, and drop water with the dissolved oxygen in the anode chamber 1 flows into the cathode chamber 9. The cathode chamber 9 surrounds the anode chamber 1, and the cathode chamber 9 is divided into an stainless steel membrane outer chamber and a stainless steel membrane inner chamber by a stainless steel membrane module 16, the stainless steel membrane inner chamber is filled with suspended fillers, and the suspended fillers form a moving circulation in a vertical direction of the stainless steel membrane inner chamber along with the movement of aeration airflow, so that the membrane surface is scrubbed to improve the biological fouling situation, and the dissolved oxygen level in the chamber is balanced, which is beneficial to the biodegradation of pollutants. The fouling migration characteristics of the stainless steel membrane module 16 are conducive to maintaining the stability of the microelectric field on the electro-membrane surface efficiently and ensuring the continuity of the electro-reduction degradation of pollutants.

In the description of the present application, it should be understood that the orientation or positional relationship indicated by terms "longitudinal", "transverse", "upper", "lower", "front", "rear", "left", "right", "vertical", "horizontal", "top", "bottom", "inner", "outer", etc. is based on the orientation or positional relationship shown in the drawings, and is only for the convenience of describing the present application, rather than indicating or implying that the device or element referred to must have a particular orientation, be constructed and operate in a particular orientation, and therefore should not be understood as limiting the application.

It should be understood that the technical schemes of the present application are not limited to the limits of the above specific embodiments, and any technical variations made according to the technical solutions of the present application, without departing from the scope protected by the objective and claims of the present application, fall within the scope of protection of the present application.

What is claimed is:

1. A suspended bed electro-membrane bioreactor system, comprising:
    a cathode chamber, wherein the cathode chamber is a tubular structure with a sealed bottom;
    an anode chamber, wherein the anode chamber is a tubular structure, the anode chamber is located in the cathode chamber, there is a gap between an outer wall of the anode chamber and an inner wall of the cathode chamber, a middle of the anode chamber is provided with a proton channel region, a top of the anode chamber is fixedly connected with an anode cover plate, and the anode chamber is filled with an anode assembly;
    a stainless steel membrane module, wherein the stainless steel membrane module is located in the gap, and the anode assembly is electrically connected with the stainless steel membrane module;
    a polymethyl methacrylate partition plate, wherein the polymethyl methacrylate partition plate is located in the gap, the polymethyl methacrylate partition plate and the stainless steel membrane module enclose a closed cylindrical space, and the cathode chamber and the anode chamber are communicated through the polymethyl methacrylate partition plate; and
    a suspended bed, wherein the suspended bed is filled between the closed cylindrical space and the anode chamber;
    the anode assembly comprises a carbon felt, a carbon rod and biological conductive particles, the carbon felt wraps the biological conductive particles, the carbon felt wrapping the biological conductive particles is filled in the anode chamber, the carbon rod penetrates through the anode cover plate, a bottom end of the carbon rod is inserted into the carbon felt wrapping the biological conductive particles, the carbon rod is in close contact with the carbon felt and the biological conductive particles, a top end of the carbon rod extends out of the anode chamber, and the carbon rod is electrically connected with the stainless steel membrane module;

the biological conductive particles are graphite particles and activated carbon particles, wherein a volume ratio of the graphite particles to the activated carbon particles is 1:1;

the carbon felt at the top of the anode chamber has functions of diversion and biofilm formation, the carbon felt seals the top of the anode chamber and is folded down into the cathode chamber, wastewater to be treated in the anode chamber overflows through the carbon felt at the top and flows into the cathode chamber, the cathode chamber forms an aerobic biofilm formation environment due to natural ventilation with air outside the cathode chamber, and the wastewater to be treated continuously passes through the anode chamber for anaerobic treatment and the cathode chamber for continuous aerobic biological treatment;

the stainless steel membrane module comprises a stainless steel plate A, a stainless steel plate B and a carbon fiber-based conductive film, wherein a thickness of the stainless steel plate A is smaller than a thickness of the stainless steel plate B; the stainless steel plate B is fixedly connected to a side of the stainless steel plate A away from the anode chamber; the carbon fiber-based conductive film is fixedly embedded in the stainless steel plate B; and the stainless steel plate A, the stainless steel plate B and the carbon fiber-based conductive film are all electrically connected with the carbon rod;

a middle of the stainless steel plate B is provided with a cavity, the carbon fiber-based conductive film is fixedly connected in the cavity, a top of the stainless steel plate B is fixedly connected with a water outlet pipe, the water outlet pipe is communicated with the cavity, and the water outlet pipe is communicated with a peristaltic pump through a hose to discharge water under a negative pressure;

further comprising aeration devices, wherein a plurality of the aeration devices are arranged, the plurality of the aeration devices are all fixedly connected to an inner wall of a bottom of the cathode chamber, and the plurality of the aeration devices are all communicated with an external aeration pump.

2. The suspended bed electro-membrane bioreactor system according to claim 1, wherein the carbon fiber-based conductive film comprises a PVDF film, and the PVDF film is coated with a carbon fiber cloth.

3. The suspended bed electro-membrane bioreactor system according to claim 1, wherein the proton channel region comprises a plurality of channel assemblies, the plurality of channel assemblies are equidistantly arranged in a circumferential direction, each of the channel assemblies comprises a plurality of pore channels arranged equidistantly in a vertical direction, and the pore channels penetrate through on the outer wall of the anode chamber.

4. The suspended bed electro-membrane bioreactor system according to claim 1, further comprising a saturated calomel reference electrode, a top of the anode cover plate is penetrated with a reference electrode port, the saturated calomel reference electrode is inserted into the anode chamber through the reference electrode port, and the saturated calomel reference electrode is electrically connected with an external data collection system.

5. The suspended bed electro-membrane bioreactor system according to claim 1, wherein the suspended bed is a filler inoculated with aerobic sludge.

6. The suspended bed electro-membrane bioreactor system according to claim 1, wherein the bottom of the cathode chamber is communicated with a water inlet valve, a water outlet end of the water inlet valve is communicated with a water inlet pipe B, a bottom of the anode chamber is communicated with a water inlet pipe A, and the water inlet pipe A is communicated with the water inlet pipe B.

* * * * *